United States Patent [19]

Scheuneman

[11] 3,898,618

[45] Aug. 5, 1975

[54] FAIL-SAFE PRIORITY SYSTEM

[75] Inventor: James H. Scheuneman, St. Paul, Minn.

[73] Assignee: Sperry Rand Corporation, New York, N.Y.

[22] Filed: June 10, 1974

[21] Appl. No.: 477,942

[52] U.S. Cl. ............................ 340/147 LP; 307/232

[51] Int. Cl. ........................... H04q 9/00; H03k 5/20

[58] Field of Search ................ 340/147 LP; 307/232

[56] References Cited

FOREIGN PATENTS OR APPLICATIONS

| | | | |
|---|---|---|---|
| 1,132,632 | 7/1962 | Germany | 340/147 LP |
| 2,003,150 | 8/1970 | Germany | 340/147 LP |

*Primary Examiner*—Donald J. Yusko
*Attorney, Agent, or Firm*—Kenneth T. Grace; Thomas J. Nikolai; Marshall M. Truex

[57] ABSTRACT

A priority system is disclosed in which "runt" signals, i.e., signals not conforming to the designed-for waveform, do not generate erroneous priority signals. A tunnel diode detector is coupled intermediate each request receive flip-flop that receives the associated request receive signal and the associated priority select flip-flop that holds the associated request receive signal. The tunnel diode detector switches or not switches with no uncertain ringing or oscillating conditions providing positive, i.e., fail-safe priority signals.

4 Claims, 6 Drawing Figures

FAIL-SAFE PRIORITY SYSTEM

BACKGROUND OF THE INVENTION

In the prior art, the priority system could generate a runt signal if a priority request signal and a clock signal were initiated at substantially the same time. The runt signal, when used to switch, i.e., Set or Clear, an associated priority select flip-flop, could cause the associated priority select flip-flop to ring or to oscillate between its two bistable states and eventually settle into an unpredeterminable one of such two states causing the associated one-out-of-N priority network to generate erroneous priority signals. Further, even if the request hold flip-flop could be designed to accept runt signals and to be switched into its proper state after ringing, the delay period required to allow for dampening of the ringing sequence would extend beyond the normal memory cycle, e.g., a read then write operation in a core memory system, preventing the efficient operation thereof. Thus, there is required a priority system not subject to the deleterious effects of the above ringing sequence.

SUMMARY OF THE INVENTION

In the priority system of the present invention, there is provided a receiving register formed of a plurality of request receive flip-flops. Each request receive flip-flop is adapted to receive and store an associated priority request signal coupled thereto by the associated data processing system. Additionally provided is a holding register formed of a plurality of priority select flip-flops for holding selected ones of said priority request signals that are held in the associated request receive flip-flops of the receiving register. Intermediate each request receive flip-flop and the associated priority select flip-flop are an associated REQ AND gate and a tunnel diode detector. A CNP AND/NOR gate receives at each of its input AND gates the output of an associated one of the request receive flip-flops and a clock new priority (CNP) signal.

Prior to the receipt of a request receive signal at one of the request receive flip-flops, the CNP signal is Hi and the outputs of the request receive flip-flops are Lo causing the CNP AND/NOR gate to couple an enabling Hi signal to the REQ AND gates. When the first request receive signal is received to Set its associated request receive flip-flop, the Set request receive flip-flop couples a Hi signal to its associated REQ AND gate and to its associated input AND gate of the CNP AND/NOR gate. This causes the CNP AND/NOR gate to generate, after a predetermined delay period, a disabling Lo signal that is coupled to, and disables, the REQ AND gates. However, during this predetermined delay period the REQ AND gates are enabled permitting any Set request receive flip-flop to couple its request receive signal to its associated tunnel diode detector and thence into the associated priority select flip-flop. After the predetermined delay period the disabling Lo signal from the CNP AND/NOR gate prevents any Set request receive flip-flop from affecting the state of its associated tunnel diode detector. If a request receive flip-flop is Set at substantially the same time that the disabling Lo signal from the CNP AND/NOR gate is generated and coupled to the REQ AND gates it may cause a runt signal to be coupled to its associated tunnel diode detector. However, because of the switching characteristics of a tunnel diode the tunnel diode detectors switch or not switch with no uncertain ringing or oscillating conditions providing positive coupling of the request receive signals to the associated priority select flip-flops precluding thereby the generation of erroneous priority signals.

DESCRIPTION OF THE PRIOR ART

Figure 1:
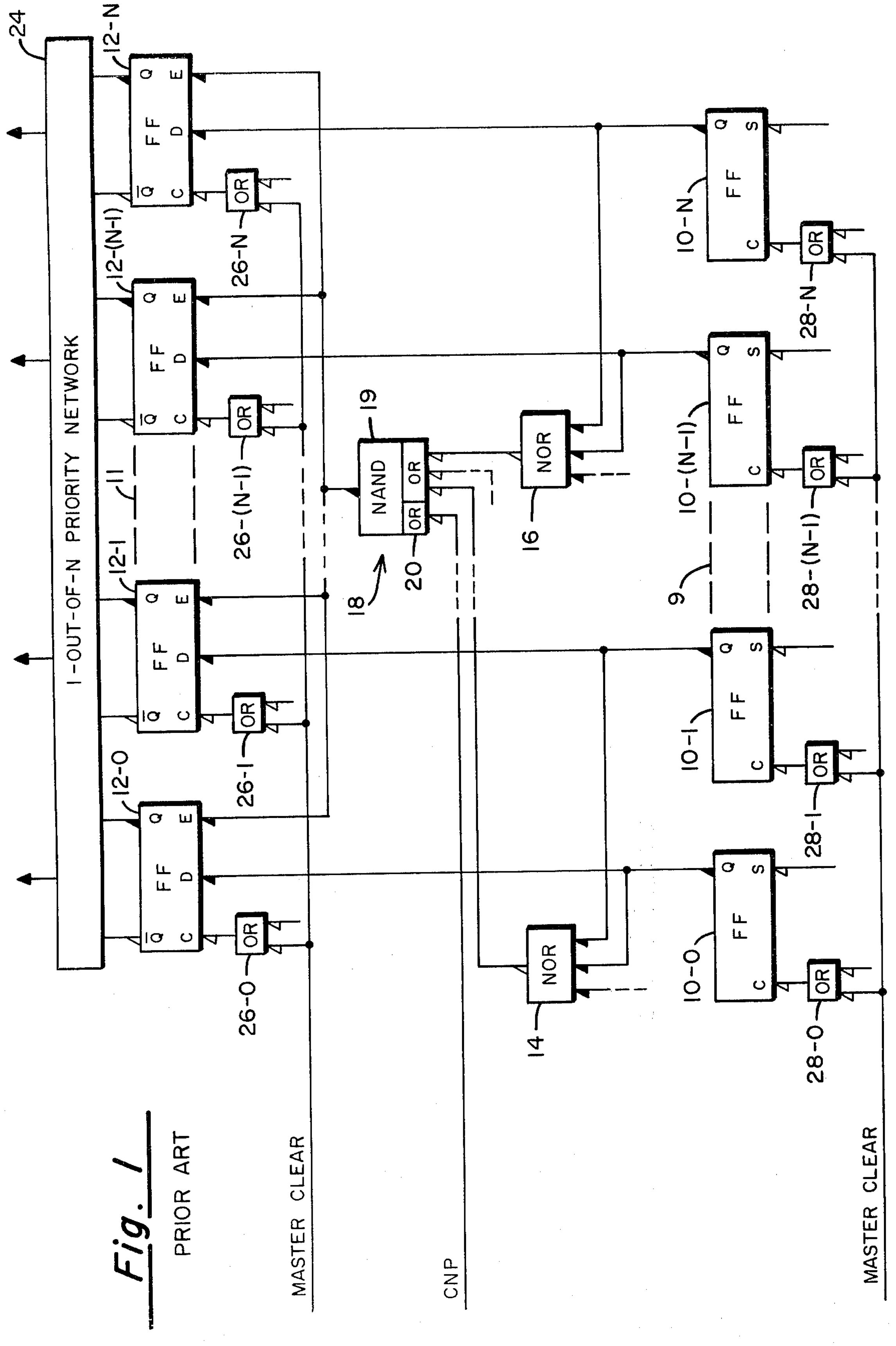
Fig. 1 PRIOR ART
FIG. 1 is an illustration of a prior art priority system.
Figure 2:
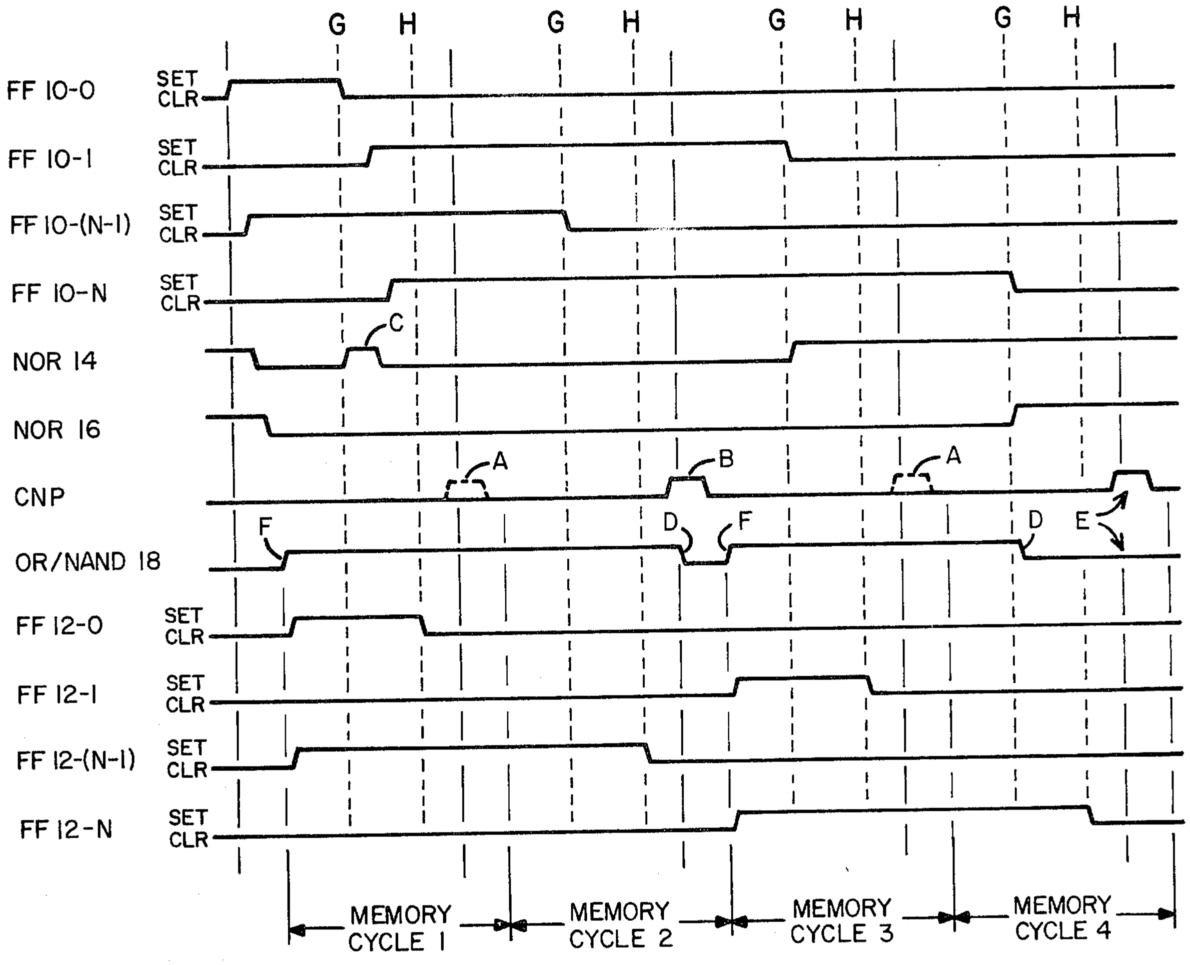
Fig. 2 PRIOR ART
FIG. 2 is an illustration of a timing diagram associated with the priority system of FIG. 1.

With particular reference to FIGS. 1 and 2 there are illustrated a prior art priority system and a timing diagram therefor; the following notes apply to FIG. 2:

A. Not generated because a FF 12 is Set.

B. Generated because no FF is Set.

C. NOR 14 output goes Hi when FF 10-0 is Cleared and then goes Lo when FF 10-1 is Set.

D. OR/NAND 18 output goes Lo when all FFs 10 are Clear.

E. CNP goes Hi but, as all FFs 10 are Clear, OR/-NAND 18 output stays Lo.

F. Positive transition of OR/NAND 18 output transfers FF 10 into FF 12. If D input to FF 12 changes at substantially the same time as E input to FF 12, ringing occurs.

G. FF 10 selectively Cleared when associated priority request is satisfied.

H. FF 12 selectively Cleared when associated priority request is satisfied. In this prior art configuration, there is provided a receiving register 9 formed of a plurality of request receive flip-flops (FFs) 10-0, 10-1, . . . 10-(N-1), 10-N, each request receive flip-flop 10 being adapted to receive and store an associated priority request signal. Additionally provided is a priority select register 11 formed of a plurality of priority select FFs 12-0, 12-1, . . . 12-(N-1), 12-N, for holding selected ones of said priority request signals held in the associated request receive flip-flops of the receiving register 9. Intermediate receiving register 9 and priority select register 11 is one or more NORs 14, 16 and an OR/NAND 18. The output of each request receive FF 10 is coupled as a separate input to one of the NORs 14, 16 and as a Data (D) input to an associated one of the priority select FFs 12. The outputs of the NORs 14, 16 are, in turn, coupled as OR'ed inputs to OR/NAND 18, the output of which is coupled in parallel to the Enable (E) input of all of the priority select FFs 12. A clock new priority (CNP) signal is coupled as a separate input OR input to OR/-NAND 18, as at OR 20, such that when the CNP signal is Lo⇒4a Lo⇒4signal from one more of the NORs 14, 16 (representative of the associated request receive FF 10 holding a priority request signal) causes the output of OR/NAND 18 to go Hi⇒4 enabling the Data input from the request receive flip-flop to be gated into the associated priority select FF 12. Thus, Data from the request receive FFs 10 are self-clocked into the associated priority select FF 12 except when blocked by a Hi⇒4CNP signal. As each of the priority request signals, as stored in the priority select FFs 10 are serviced through the one-out-of-N priority network 24 the associated request receive FFs 10 and priority select FFs 12 are Cleared via a selective Clear signal coupled to the Clear OR gates 26-0, 26-1, . . . 26-(N-1), 26-N and 28-0, 28-1, . . . 28-(N-1), 28-N, respectively, at the C input.

When the output of OR/NAND 18 goes positive (E →4 ) the priority system initiates a memory cycle. If only one priority request signal had been received by the request receive FFs 10 but during the memory cycle one or more additional priority request signals are received by the request receive FFs 10 these additional priority request signals would not be loaded into their associated priority select FFs 12 as the output of OR/NAND gate 18 would remain Hi ⇒4 (a positive transition E →4 is required to load the Data input into the priority select FFs 12). Near the end of the memory cycle the outputs of the priority select FFs 12 are checked to determine if there are any more priority request signals loaded therein (Q⇒4). If no priority select FFs 12 are SET then the signal Hi Clock New Priority (CNP) is generated causing the output of OR/NAND 18 to go Lo⇒4; if no priority receive FFs 10 are SET the output of OR/NAND gate 18 would already be Lo ⇒4. If any priority receive FF 10 is SET a positive transition of the output of OR/NAND gate 18 (E →4 ) will occur as the signal Hi Clock New Priority (CNP) goes low (CNP →4 ) resulting in the new priority request signals held in the associated priority receive FFs 10 being loaded or transferred into the associated priority select FFs 12.

In this prior art configuration, the priority system could generate a clock signal, the positive-going transition of the output signal of OR/NAND 18 at the E inputs of the priority select FFs 12, at about the same time that one or more priority request signals were received by the priority receive FFs 10. While the first priority request signal received by priority receive FFs 10, which first priority request signal is the priority request signal that will initiate the clock signal, will definitely be loaded into its associated priority select FF 12, the possibility exists that one or more priority request signals will be received by their associated priority receive FFs 10 at substantially the same time that the clock signal is generated. If the Data inputs to the priority select FFs 12 change at substantially the same time as the clock signal (E →4 ), the associated priority select FF 12 will ring or have a delayed setting time and may eventually settle into an indeterminable one of its two stable states. This ringing of the priority select FFs 12 causes the one-out-of-N priority network 24 to generate and to couple erroneous priority request signals to its output lines.

DESCRIPTION OF THE PREFERRED EMBODIMENT

Figure 3:
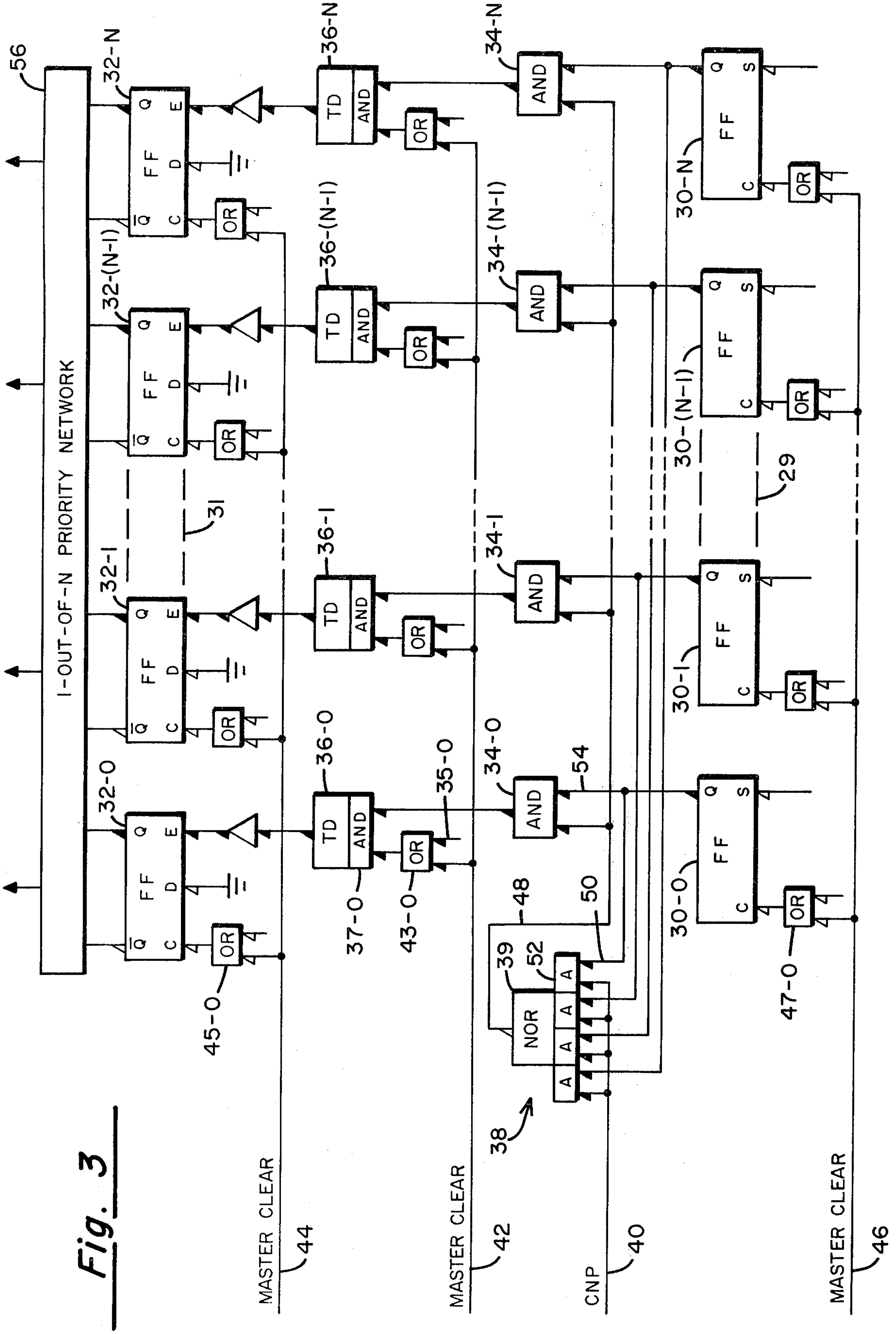
FIG. 3 is an illustration of a priority system incorporating the present invention.
Figure 4:
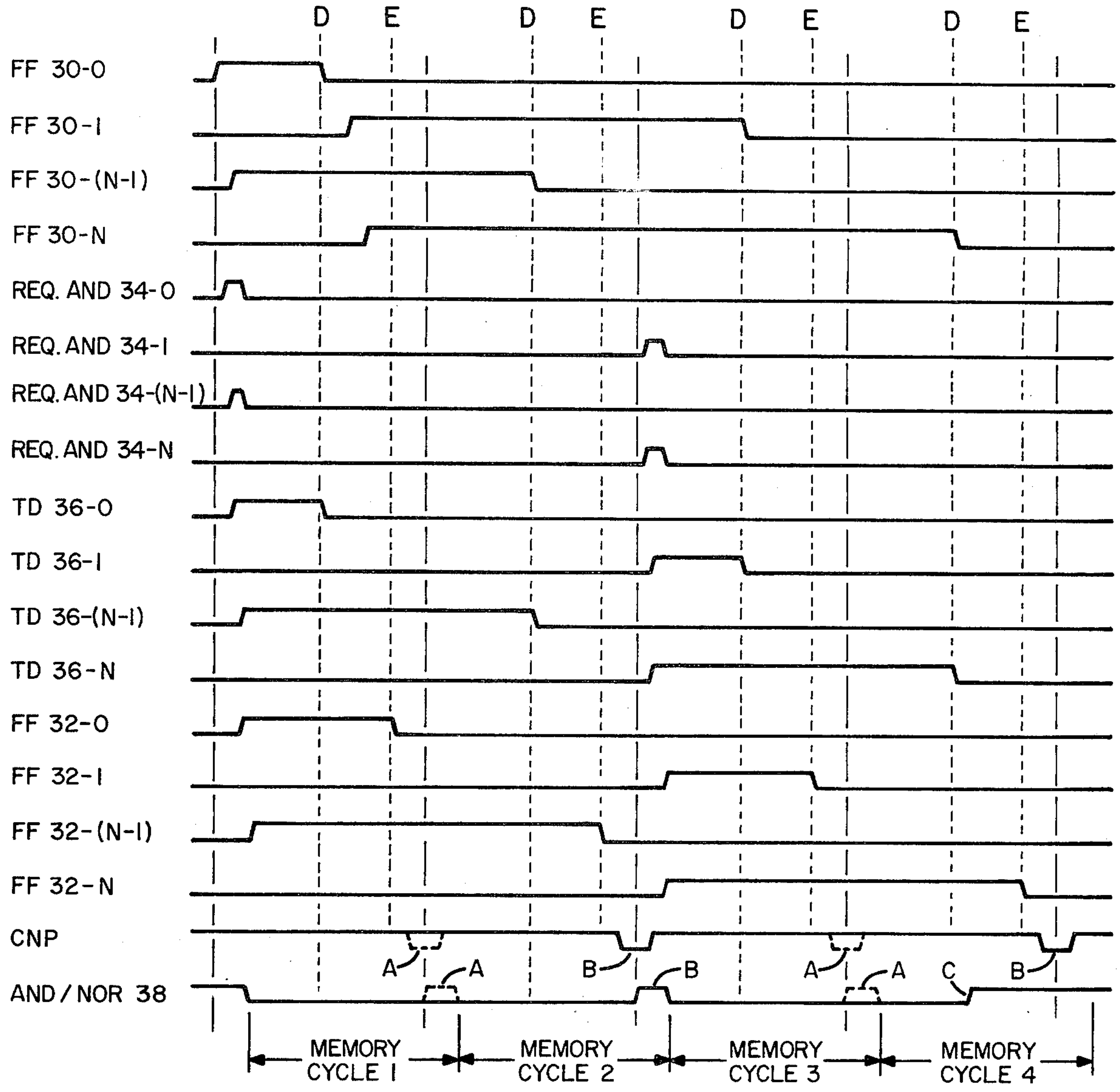
FIG. 4 is an illustration of a timing diagram associated with the priority system of FIG. 3.

With particular reference to FIGS. 3, 4 there are illustrated a priority system incorporating the present invention and the timing diagram therefor; the following notes apply to FIG. 4:

A. Not generated because a FF 32 is Set.

B. Generated because of FF 32 is Set. Timing required because outputs of FF 30-1 and FF 30-N hold AND/NOR 38 Lo preventing new priority requests to be loaded into FF 32.

C. AND/NOR 38 output goes Hi when all FF 30 are Clear so that new priority requests can be transferred into corresponding FF 32.

D. FF 30 and TD 36 selectively Cleared when associated priority request is satisfied.

E. FF 32 selectively Cleared when associated priority request is satisfied. In the configuration of FIG. 3, as in that of FIG. 1, there is provided a receiving register 29 formed of a plurality of request receive flip-flops (FFs) 30-0, 30-1, . . . 30-(N-1), 30-N, each request receive FF 30 being adapted to receive and store an associated priority request signal. Additionally, as in the configuration of FIG. 1, there is provided a holding register 31 formed of a plurality of priority select FFs 32-0, 32-1, . . . 32-(N-1), 32-N for holding selected ones of said priority request signals held in the associated request receive FFs 30-0, 30-1, . . . 30-(N-1), 30-N, respectively, of receiving register 29.

Intermediate each request receive FF 30 and the associated priority select FF 32 are an associated REQ AND gate 34-0, 34-1, . . . 34-(N-1), 34-N and an associated tunnel diode (TD) detector 36-0, 36-1, . . . 36-(N-1), 36-N. A CNP AND/NOR gate 38 receives as a first associated input AND gate input the output of the associated request receive FF 30 and a CNP signal on line 40 as the second associated input AND gate input. Normally, the CNP signal on line 40 is Hi⇒4enabling the associated input AND gates to couple one or more of the request receive signals to the associated single NOR gate 39 the output of which normally enables the associated REQ AND gates 34-0, 34-1, . . . 34-(N-1), 34-N permitting the associated request receive signal to be gated into the associated TD detector 36-0, 36-1, . . . 36-(N-1), 36-N, respectively, it being understood that the Clear (TDC) signal on line 42 is normally Hi ⇒4, and thence into the associated priority select FF 32-0, 32-1, . . . 32-(N-1), 32-N, respectively.

Prior to the receipt of a request receive signal at one of the request receive FFs 30, the CNP signal on line 40 is Hi⇒4and the outputs of the request receive FFs 30 are Lo ⇒4 causing CNP AND/NOR 38 to couple an enabling HI⇒4signal on line 48 as first enabling inputs to the REQ ANDs 34. When the first request receive signal is received to Set its associated request receive FF 30, e.g., FF 30-0, the Set request receive FF 30-0 couples a Hi⇒4signal via line 54 to its associated REQ AND gate 34-0 and to its associated input AND gate 52 of the CNP AND/NOR gate 38 via line 50. This causes the CNP AND/NOR gate 38 to generate, after a predetermined delay period determined by the internal electronics thereof, a disabling Lo⇒4signal via line 48 that is coupled in parallel to, and disables, the REQ ANDs 34. However, during this predetermined delay period all of the REQ ANDs 34-0, 34-1, . . . 34-(N-1), 34-N are enabled permitting any Set request receive FF 30-0, 30-1, . . . 30-(N-1), 30-N to couple its request receive signal to its associated TD detector 36-0, 36-1, . . . 36-(N-1), 36-N, respectively, and thence into the associated priority select FF 32-0, 32-1, . . . 32-(N-1), 32-N, respectively.

After the expiration of this predetermined delay period established by CNP AND/NOR 38, the disabling Lo⇒4signal from the CNP AND/NOR gate 38 via line 48 prevents any of the other (e.g., other than the previously Set request receive FF 30) request receive FFs 30-1, . . . 30-(N-1), 30-N, if Set after the predetermined delay period, from being gated into their associated TD detector 36-1, . . . 36-(N-1), 36-N, respectively, by their associated REQ AND 34-1, . . . 34-(N-1), 34-N, respectively.

If one of the other request receive FFs 30-1, . . . 30-(N-1), 30-N is also Set during this predetermined delay period its associated REQ ANDs 34-1, . . . 34-(N-1), 34-N, respectively, is, of course, still enabled, by the Hi ⇒4signal emitted by CNP AND/NOR 38 via line 48, to be transferred into its associated TD detector 36-1, . . . 36-(N-1), 36-N, respectively. However, if a request receive FF 30, e.g., FF 30-N, is Set at substantially the same time that the disabling Lo ⇒4 signal from CNP AND/NOR 38 is generated and coupled to the associated REQ AND 34-N, REQ AND 34-N, because of its ANDing characteristics, may cause a runt signal to be coupled to its associated TD detector 36-N. However, because of the switching characteristics of a tunnel diode, TD detector 36-N will switch or will not switch with no uncertain ringing or oscillating conditions between its switched or not switched state providing positive coupling of the request receive signal held in request receive FF 30-N to the associated TD detector 36-N. This positive coupling of the request receive signals to the associated priority select FFs 32 near the termination of the predetermined delay period established by CNP AND/NOR 38 overcomes the ringing problem associated with the prior art system of FIGS. 1, 2 and, accordingly, the generation of erroneous priority signals within one-out-of-N priority network 56.

Figure 5:
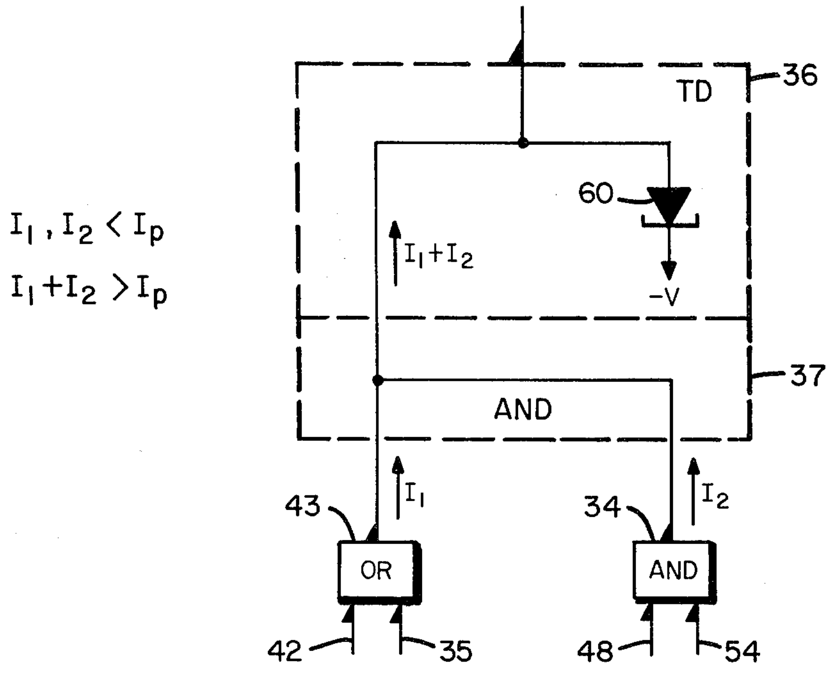
FIG. 5 is an illustration of a tunnel diode detector incorporated in the priority system of FIG. 3.
Figure 6:
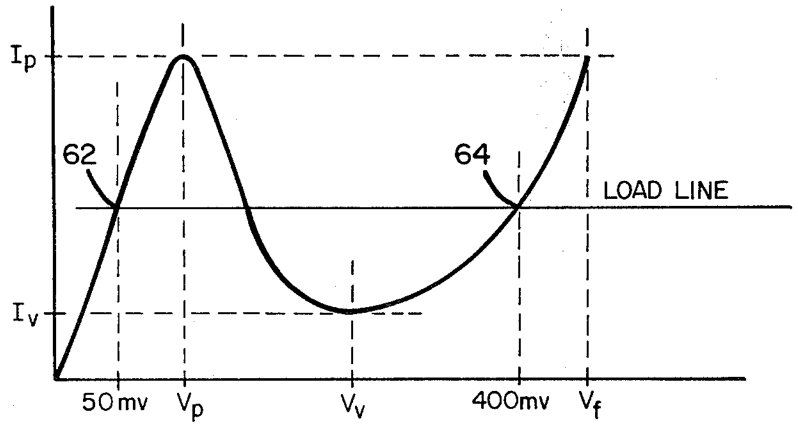
FIG. 6 is an illustration of the I/V operating characteristics of the tunnel diode of FIG. 5.

With particular reference to FIGS. 5 and 6 there are illustrated a TD detector 36 and the I/V operating characteristics thereof incorporated in the priority system of FIG. 3. As is well known the operating condition of TD 60 can exist only in state 62 or 64 as illustrated in FIG. 6. Normally, TD 60 is operating in state 62 (as when Hi signals are coupled to input lines 42, 35 of OR 43 and a Lo signal is coupled to one of the input lines 54, 48 of REQ AND 34) due to the flow of current signal $I_1$ into AND 37. When a priority request signal is received as by request receive FF 30 its Hi output on line 54 (when enabled by a Hi signal on line 48 from NOR 39) causes current signal $I_2$ to flow into AND 37. The current signal $I_1 + I_2$ from AND 37 switches the operating condition of TD 60 from Clear state 62 to Set state 64.

After the priority request signal has been satisfied or honored, TD 60 may be switched, or Cleared, back to state 62 by a Lo Master Clear TDC signal on line 42 or a selective TDC signal on line 35 in preparation for a new priority request signal.

What is claimed is:

1. A fail-safe priority system, comprising:

receiving means for receiving a plurality of priority request signals;

holding means for holding selected ones of said priority request signals;

a plurality of tunnel diode detector means, each adapted to receive a separate associated one of said priority request signals from said receiving means for coupling the associated one of said priority request signals to said holding means;

clocking means, intermediate said receiving means and said plurality of tunnel diode detector means, generating a clocking signal when said holding means holds no selected ones of said priority request signals, for coupling to the associated ones of said tunnel diode detector means the priority request signals that have been received by said receiving means since the previous clocking signal.

2. The fail-safe priority system of claim 1 in which said clocking means includes:

a plurality of AND gates, each separate one coupled to said receiving means for receiving as a first input signal a separate associated one of said priority request signals from said receiving means;

an AND/NOR gate receiving said plurality of priority request signals and a new priority clock signal and generating as an output signal a priority enable signal that is, in turn, coupled to said AND gates as a second input signal for enabling each of said AND gates to couple the associated one of said priority request signals to the associated one of said diode detector means.

3. The fail-safe priority system of claim 2 in which said AND/NOR gate output signal normally enables the first one of said priority request signals received by said receiving means to be coupled to the associated one of said tunnel diode detector means through the associated one of said AND gates.

4. The fail-safe priority system of claim 3 in which said AND/NOR gate has a predetermined delay period initiated by said first priority request signal for enabling the priority request signals received by said receiving means after said first priority request signal but only during said delay period to be coupled to the associated ones of said tunnel diode detector means through the associated ones of said AND gates.

* * * * *